Oct. 11, 1955 W. H. INMAN 2,720,143
MACHINE FOR SETTING UP CARTONS
Filed May 26, 1949 10 Sheets-Sheet 1

INVENTOR.
WILLIAM H. INMAN
BY
Edward H Cumpston
HIS ATTORNEY

Oct. 11, 1955  W. H. INMAN  2,720,143
MACHINE FOR SETTING UP CARTONS
Filed May 26, 1949  10 Sheets-Sheet 4

INVENTOR.
WILLIAM H. INMAN
BY
*Edward H. Cumpston*
HIS ATTORNEY

FIG. 6.

INVENTOR.
WILLIAM H. INMAN
BY
*Edward H. Cumpston*
HIS ATTORNEY

INVENTOR.
WILLIAM H. INMAN
BY
HIS ATTORNEY

Oct. 11, 1955 W. H. INMAN 2,720,143
MACHINE FOR SETTING UP CARTONS
Filed May 26, 1949 10 Sheets-Sheet 8

INVENTOR.
WILLIAM H. INMAN
BY
Edwards J Cumpston
HIS ATTORNEY

Oct. 11, 1955  W. H. INMAN  2,720,143
MACHINE FOR SETTING UP CARTONS
Filed May 26, 1949  10 Sheets-Sheet 9

INVENTOR.
WILLIAM H. INMAN
BY
Edward H. Cumpston
HIS ATTORNEY

Oct. 11, 1955 W. H. INMAN 2,720,143
MACHINE FOR SETTING UP CARTONS
Filed May 26, 1949 10 Sheets-Sheet 10

INVENTOR.
WILLIAM H. INMAN
BY
Edward H. Crumpston
HIS ATTORNEY

UNITED STATES PATENT OFFICE 2,720,143
Patented Oct. 11, 1955

2,720,143

MACHINE FOR SETTING UP CARTONS

William H. Inman, Newark, N. Y., assignor to Bloomer Bros. Company, Newark, N. Y., a corporation of New York Application May 26, 1949, Serial No. 95,488

24 Claims. (Cl. 93—37)

This invention relates to machines for setting up cartons and, more particularly, to cartons of the cellular variety for holding eggs and the like, and such as are adapted to be compactly stored and shipped in flatly collapsed condition and to be unfolded and set up as a preliminary to receiving the contents. Such cartons commonly comprise a bottom, front and rear side walls, and a cover, with a false top which is cut to provide a plurality of transverse partitions hinged at their tops to the tops of the side walls and adapted to be swung into vertical position to form the cells, as disclosed in my Letters Patent No. 2,277,327, dated March 24, 1942, wherein the carton is shown in collapsed condition in Fig. 8 and in set up condition in Fig. 9. Such cartons may have their transverse partitions all arranged to swing in the same direction, or, as shown in said patent (Fig. 1), the partitions may be arranged in two groups swinging in opposite directions for purposes explained in said patent.

One object of the invention is to provide an improved machine for unfolding and setting up said cartons, having a more simple, practical and efficient type of construction.

Another object is the provision of such a machine in which the collapsed cartons are fed from a stack and advanced along a path or guideway by a continuous motion which is advantageously utilized to partially effect the unfolding or distending and setting up of the carton side walls, with a minimum of movable machine parts.

A further object is to supply a machine of the above character in which the continuous movement of the blank not only serves to set up the side walls of the carton, but also facilitates the setting up of the transverse partitions by simple and effective means rotating in situ during the movement of the carton.

Still a further object is to provide a machine having the above advantages and adapted for setting up transverse partitions swinging in opposite directions as disclosed in said patent.

To these and other ends the invention resides in certain improvements and combinations of parts, all as will be hereinafter more fully described, the novel features being pointed out in the claims at the end of the specification.

In the drawings:

Fig. 1ª is a view similar to Fig. 1 but showing the other half part or delivery end of the machine;

The invention is embodied in the present instance, by way of illustration, in a machine adapted for setting up a carton such as disclosed in said patent and shown in Figs. 2, 3, 5 and 9 of the present application, comprising a one-piece blank which is cut, scored and folded to form a cushioning bottom wall 25 (Fig. 9) of inverted V-shape, a front wall 26, a rear wall 27 and a cover 28, with a false top wall, indicated generally at 29, foldably connected at one side with the top of the front wall 26 and at the other side with an edge strip 30 which is glued to the top of the rear wall. This top wall is cut into sections forming a plurality of partitions, as 31, each foldably connected at its opposite top corners by triangular hinge parts 32, with the front and rear walls and adapted to be swung downwardly to vertical position, as shown in Figs. 11 to 15, inclusive, to form transverse partitions dividing the carton into cells for the articles to be contained.

In the present instance, the partitions 29 are in two groups each having its partitions folding downwardly in opposite directions. Thus the partition 33 (Fig. 9) and the other partitions of the same group are swung downwardly and to the right, while the adjacent partition 34 and the other partitions of its group are swung downwardly and to the left, to obtain the advantages described in said patent. The bottom edge of each partition is formed with a slit, as at 35, for frictionally embracing a longitudinal partition 36 produced by upwardly folded central portions of the bottom wall, as shown. Portions 37 may be cut from the bottom wall (Figs. 9 and 15) to extend downwardly in prolongation of the central partition 36 and form supporting feet and the central portion 38 of the lower edge of each partition may be extended and shaped to engage in the bottom openings left by the feet 37, to secure the partitions in vertical position.

Figures 1, 2:
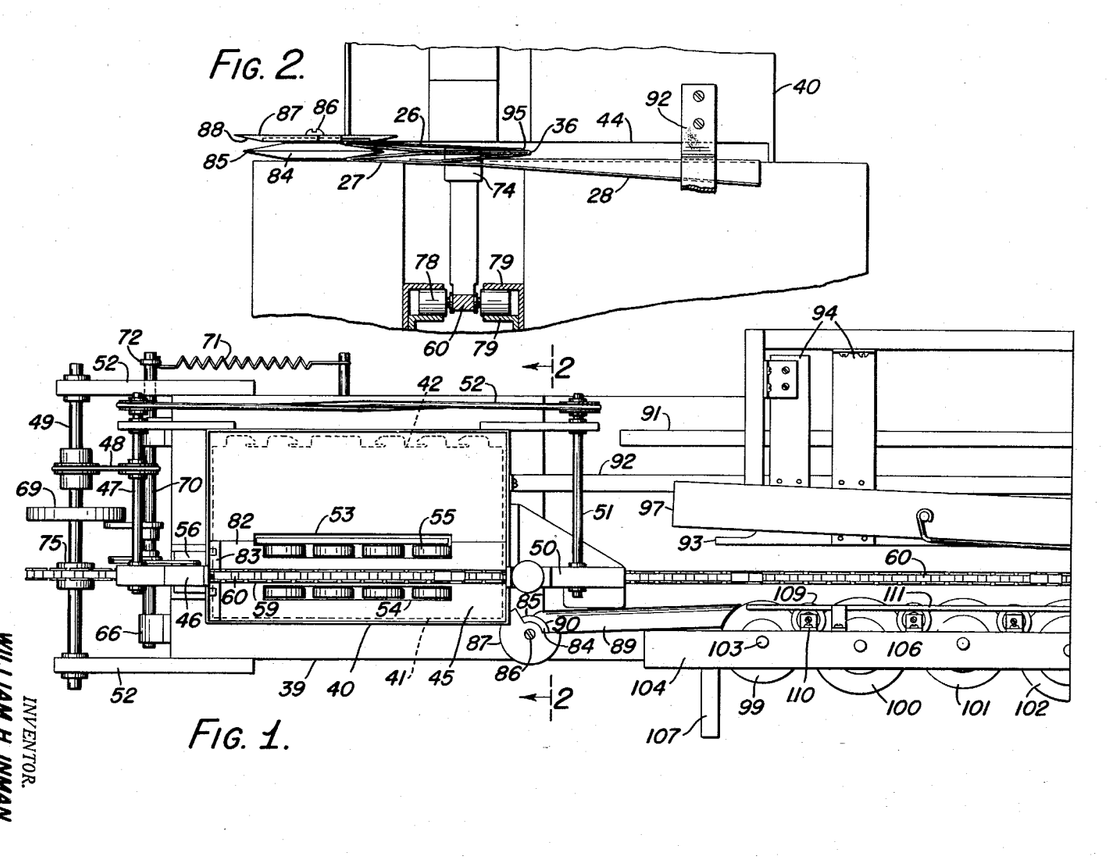
Fig. 1 is a plan view of part of a machine embodying the present invention and showing the blank receiving or hopper end and adjacent parts.
Fig. 2 is an enlarged, fragmentary elevation on the line 2—2 in Fig. 1.
Figures 3, 4:
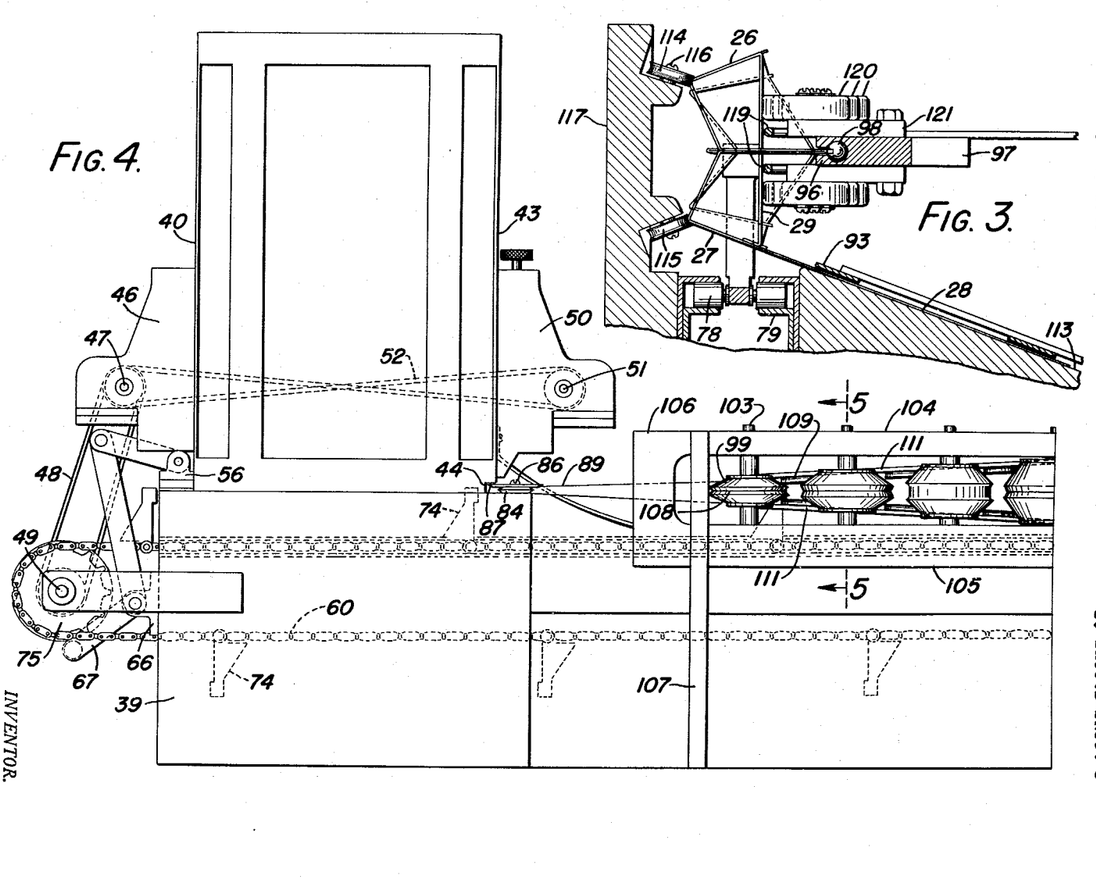
Fig. 3 is a sectional elevation on the line 3—3 in Fig. 1ª.
Fig. 4 is an elevation of the parts of the machine shown in Fig. 1 as viewed from the bottom of the sheet.
Figure 5:
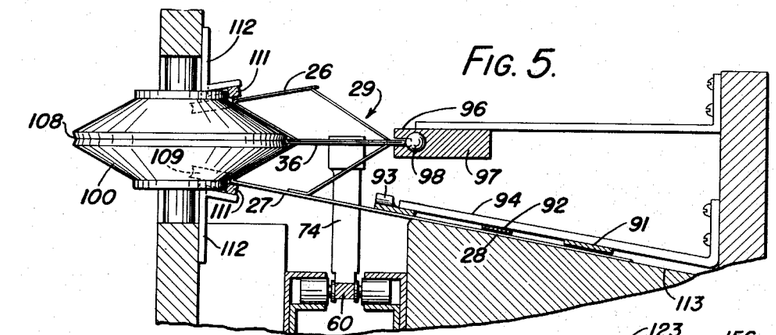
Fig. 5 is an enlarged, sectional elevation, partly broken away, on the line 5—5 in Fig. 4.

In collapsed position as shown in said patent and in varying degree in Figs. 2, 3 and 5 hereof, the bottom and top walls are folded upwardly about the longitudinal centers thereof, collapsing in front and rear walls against opposite sides of the longitudinal partition 36, so that the carton, in its flat condition, has a thickness of some four or five plies of the cardboard material, and this is the condition in which it is compactly stored and shipped and from which it is set up by the present machine.

The machine comprises a hopper for receiving a stack of such collapsed cartons, with means for feeding the cartons, one by one, from the bottom of the stack to a path or guideway along which they are advanced by continuous movement during which the side walls, including the bottom and top walls, are separated, distended and set up and the transverse partitions are then swung to upright position to complete the setting up of the carton, by means which will now be described.

The machine preferably comprises a generally rectangular frame 39 (Figs. 1 and 4), having side and end walls on which the mechanism is supported. Mounted on one end of this frame is a hopper casing 40 adapted to receive a stack of vertically superposed cartons in flatly collapsed condition, as indicated generally in broken lines at 41, the ply of material including the cover being lowermost with the cover extending toward the side 42 of the hopper. The inner wall 43 of the hopper is cut away at 44, above the bottom 45 of the hopper, to provide a feed opening through which the cartons are advanced toward the setting up mechanism hereafter described. Means are preferably provided for settling and pressing the stack of cartons downwardly at each end of the hopper, to dispose the lowermost carton in position for engagement by the feeding means and ejection through the slot 44, such as the known serrated chain device, for engaging the edges of the stack of cartons and pressing them downwardly in the hopper. Such a device is indicated at 46 at one end of the hopper, having a driving shaft 47 rotated by a belt 48 passing around a pulley on a shaft 49 having its ends mounted in bearings on arms extending from the machine frame and driven by means hereafter described. A similar device 50 at the other end of the hopper has a drive shaft 51 rotated by a belt 52 passing around pulleys fixed on it and on shaft 47, as shown. Such means for pressing the blank stack downwardly, however, may have any known and suitable construction and form no part of the present invention.

The bottom 45 of the hopper is preferably formed with openings, 53 and 54, through which a plurality of rollers, as 55, project slightly above the bottom of the hopper, the rollers being preferably mounted on ball bearings and adapted to support the bottom carton of the stack for movement with a minimum of friction as it is fed to the folding positions by the means hereafter described.

Figure 7:
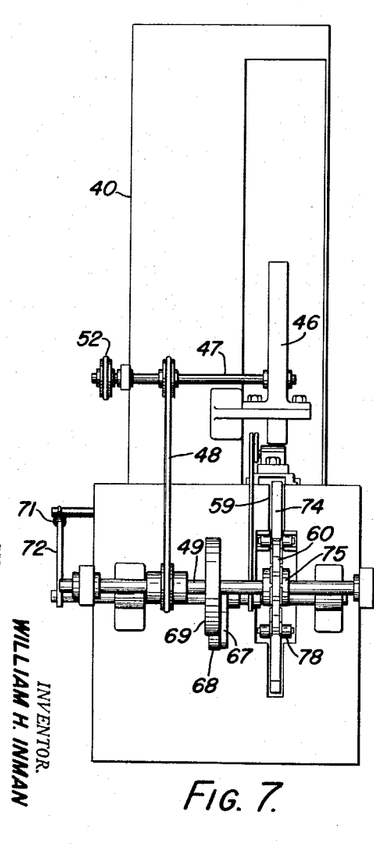
Fig. 7 is an end elevation of the machine as viewed from the left in Fig. 1.

The bottom carton is given an initial feeding movement, to separate it from those in the stack above, by means comprising, preferably, a reciprocating body 56 (Figs. 1 and 16 to 18, inclusive), having a bifurcated base the legs of which include thin plates 57 sliding on the top of the machine frame under gibs 58 which guide the body 56 for a rectilinear reciprocating movement toward and from the carton stack. The legs of the body 56 straddle a slot 59 in the bottom of the hopper below which is a chain 60 provided with means for moving the cartons through the unfolding devices hereafter described. Body 56 carries a stud 61 with which is pivotally connected a link 62 having its other end pivoted at 63 to one end of a link 64 having its other end fixed on a shaft 65 mounted to rock in bearings 66 on the frame. Fixed to the shaft also is an arm 67 carrying a roller 68 held against the periphery of a cam 69 on shaft 49 by a tension spring 71 fixed to the frame and to an arm 72 (Figs. 1 and 7), fixed on shaft 49. Cam 69 is notched as at 73 and is fixed on shaft 49 which is rotated by means hereafter described.

Figures 16, 17, 18, 19:
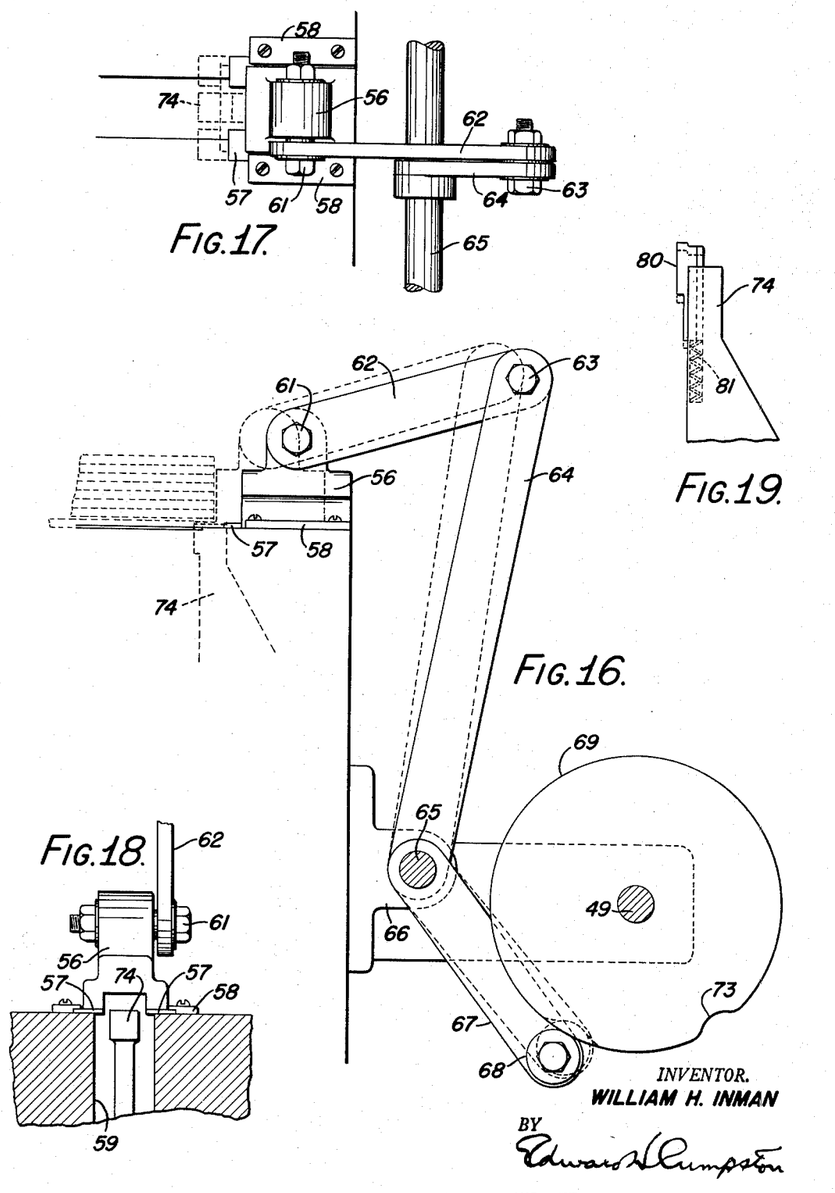
Fig. 16 is an enlarged elevation of parts shown in Fig. 6ª, with successive positions shown in full and broken lines, for feeding a blank from the hopper.
Fig. 17 is a top plan view of the parts shown in Fig. 16.
Fig. 18 is an elevation of the same parts as seen from the left in Fig. 17.
Fig. 19 is an enlarged elevation of one of the chain arms for moving the blanks.

It is evident from this construction that as roller 68 drops into notch 73 of the cam, the associated parts are moved, as indicated by broken lines in Fig. 16, to quickly advance and retract body 56 and its plate projections 57. The latter have a thickness slightly less than the height of the folded plies lying at the edge of the lowermost carton, so as to engage the bottom carton only and feed it a short distance on the hopper bottom toward the feed slot 44 and to position it for engagement by means for continuously advancing the carton along a path or guideway of the machine past the unfolding devices, as hereafter described.

The means for continuously advancing the carton preferably comprise a plurality of carton engaging means, or arms, 74, carried by and spaced along the chain 60. This sprocket chain is carried by sprocket wheels, 75 and 76, the former fixed on shaft 49 and the latter on a shaft 77 rotatably mounted in bearings at the opposite end of the machine, as hereafter described. The said arms 74 are each fixed on a link of the chain carrying oppositely extending rollers 78 (Fig. 2), moving between upper and lower guide rails 79 along the upper run of the chain, to accurately hold the arms at the desired elevation. The upper end of each arm is provided at its forward side with a vertically extending slot in which a block 80 (Fig. 19) is slidably mounted for engagement with an edge of the carton. The block is urged upwardly in the slot of the arm against a fixed stop (not shown) by a spring 81, so that the block may yield in a downward direction. The bottom of the hopper is formed with a slightly elevated track portion 82 (Fig. 1) on which the folded portion of the carton travels until engagement with the rollers 55. Track 82 has a slightly raised portion 83 (Fig. 1) adjacent the path of movement of the feed plates 57 and the tops of the blocks 80 extend to a height slightly lower than the tops of the plates.

It is evident from this construction that as the plates 57 engage the edge of a bottom carton and feed it beyond the elevated track portion 83, the top of a block 80 on one of the pusher arms 74 may be advanced under the stack of cartons resting on the plates 57 and engage the edge of the carton which has been fed to the portion 82 of the hopper track, to advance it out of the hopper to the unfolding devices. It will thus be seen that while the plates 57 engage the edge of the bottom carton below the top of its uppermost ply, so as to feed the bottom carton only out of the stack, the top of the block 80 of a pusher arm 74 passes under the stack of cartons, yielding downwardly if necessary, but engages the edge of the blank previously fed and lowered to the lower track portion 82 of the hopper bottom up to or above the top of its uppermost ply. After passing beyond the stack, block 80 may be raised by its spring above its top of the carton edge, thus insuring full engagement by the arm with the carton edge for positively advancing the same during any resistance to its movement applied by the unfolding devices. The operation of the parts is so coordinated and synchronized that the bottom carton of the stack is fed to the lower track portion 82 just prior to the approach of a pusher arm 74 for continuing the advancement of the blank.

The means or device for separating the side walls of the carton is located outside the discharge slot 44 of the hopper in position to engage the leading ends of the bottom folds of the carton as it is advanced outwardly through the slot. This means preferably comprises a plate or disk 84 (Figs. 1, 2 and 4) having a knife-edged peripheral portion 85 of arcuate shape positioned to engage between the folded bottom portions of the carton as it is advanced from the hopper. Plate or disk 48 is secured, as by a screw 86, on the top of the frame and is provided on its upper side with a guide plate 87 having the inner side of its periphery inclined, as at 88, to engage the front wall of the carton and guide it for proper entry of the edge of the disk 84 between its folds. The inwardly increasing thickness of disk 84 acts to spread the bottom folds apart, so that they pass on opposite sides of a tapered guide bar 89 having a curved end 90 (Fig. 1) extending adjacent the edge 85 of the disk, for engaging between the folds and progressively spreading them apart by the increasing thickness of the bar as the carton is advanced along it. By this means the carton folds are separated and conditioned for being unfolded and distended by guide devices positioned along its path, as hereafter described.

As the carton is thus advanced from the bottom of the hopper, its cover portion 28 passes beneath and is depressed by guide plates 91, 92 and 93 supported by brackets 94 on the frame and having their entrance ends upwardly inclined for that purpose. At the same time the longitudinal center fold 95 of the top wall 29 and the top edge of the longitudinal partition 36 pass into a V-shaped track 96 in a bar 97 (Figs. 3 and 5), the track being equipped with ball bearings 98, to reduce friction of contact. These portions and the cover are thus accurately controlled in position as the folds of the carton are separated by the disk 84 and further unfolded and distended by the devices hereafter described.

The guide means or devices for distending and setting up the side walls of the carton preferably comprise a succession of wheels or rollers, 99 to 102, inclusive (Figs. 1 and 4), each mounted on roller bearings (not shown) on vertically extending spindles, as 103, having their upper and lower ends fixed in the upper and lower sides, 104 and 105, of a yoke 106 mounted on the machine frame and buttressed by supporting elements 107. Each wheel has oppositely arranged conical sides tapered or inclined toward each other and toward the periphery of the wheel which is formed with a groove, as 108, and these wheels have progressively increasing vertical thicknesses, respectively, for purposes hereafter described.

The first wheel 99 is located adjacent the inner end of the guide bar 89, the upper and lower surfaces of which intersect the mid portions of the conical sides of the wheel, so that the wheel is arranged to enter between the bottom folds of the carton as separated by the disk 84 and bar 89. Located intermediate these wheels are pairs of upper and lower guide rollers, as 109, each roller rotatably mounted on a roller bearing carried by a bracket 110 fixed on the yoke 106. These rollers have grooved peripheries adapted to receive and guide the folds of the carton connecting the bottom portions and side walls, the rollers being spaced at progressively increasing distances from each other in each pair, to correspond with the progressive separation of the bottom folds by the wheels 99—102. Upper and lower guide strips 111 are provided above and below the rollers 109 to confine and guide the front and rear side walls of the carton, these strips being located at progressively increasing distances from each other, as shown, to correspond with the progressive distension of the bottom folds and the front and rear side walls of the carton.

It is evident from the foregoing description that the opposite sides of the wheels 99—102, the rollers 109 and guide strips 111 are arranged at an inclination to the horizontal path of travel of the bottom portions and front and rear side walls of the carton and operate by the movement of the carton along such path for distending and setting up the carton walls, as shown in Figs. 3 and 5. During such opening up of the carton, its cover slides on and is supported by a guide surface 113 on the frame and is held thereon by the guide plates 91—93 supported by the brackets 94 on the frame.

Figure 4A:
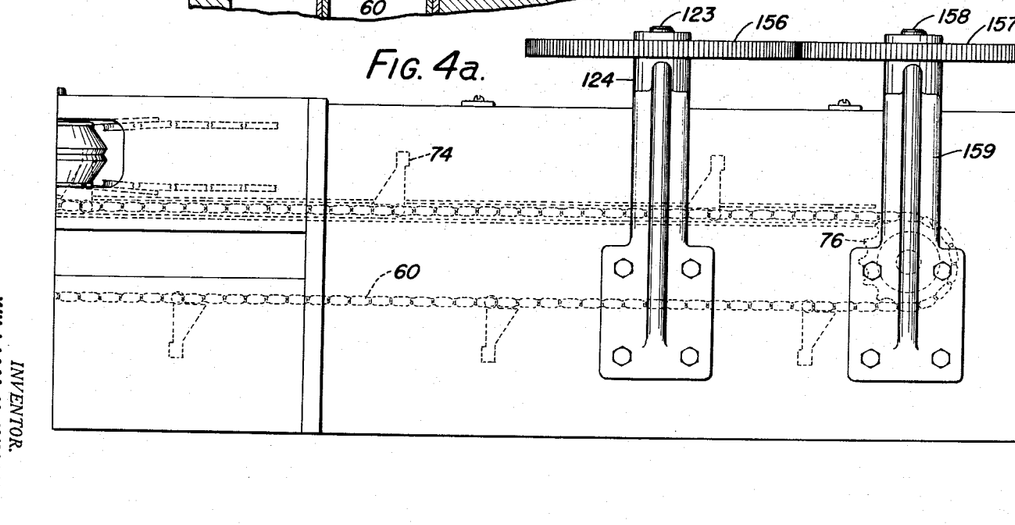

As the carton is moved continuously forward, the folds between the bottom portions and front and side walls pass into engagement with the grooved peripheries of upper and lower series of guide rolls, as 114 and 115, each roll being mounted on a stud 116 fixed in a side wall 117 of the frame. The first pair of superposed rolls are arranged at an inclination away from each other to complete the distension of the carton bottom and side walls and the remaining rolls in each series are thus arranged in parallel relation with the other series, as shown in Fig. 4ª. The face of the side wall 117 intermediate the upper and lower series of rolls is grooved as at 118 (Fig. 8) to receive and guide the feet 37 of the carton bottom which run in the grooves 108 of wheels 99—102 and are guided thereby in the groove 118 in the side wall.

As the top edge of the longitudinal partition 36 of the carton moves along in the V-shaped track 96 of bar 97 (Figs. 3 and 5), the adjacent portions of the top wall 29 of the carton, on opposite sides of the longitudinal center fold 95 thereof, are brought into sliding engagement with upper and lower rails 119 which are fixed at their ends on the upper and lower surfaces of bar 97. This bar and rails 119 are progressively inclined toward the wheels 99—102 and rolls 114 to depress the top wall portions of the carton into a common plane substantially parallel with the supporting portions of the carton bottom, assisted by rollers 120 rotatably supported on ball bearings on brackets 121 on the bar 97. By these various stationary means the walls of the carton, including its top, bottom and side walls, are fully unfolded and distended to set up the body of the carton in erected condition, ready to have the transverse partitions 31 swung downwardly into the carton to form its cells, by means hereafter described.

Figure 1A:
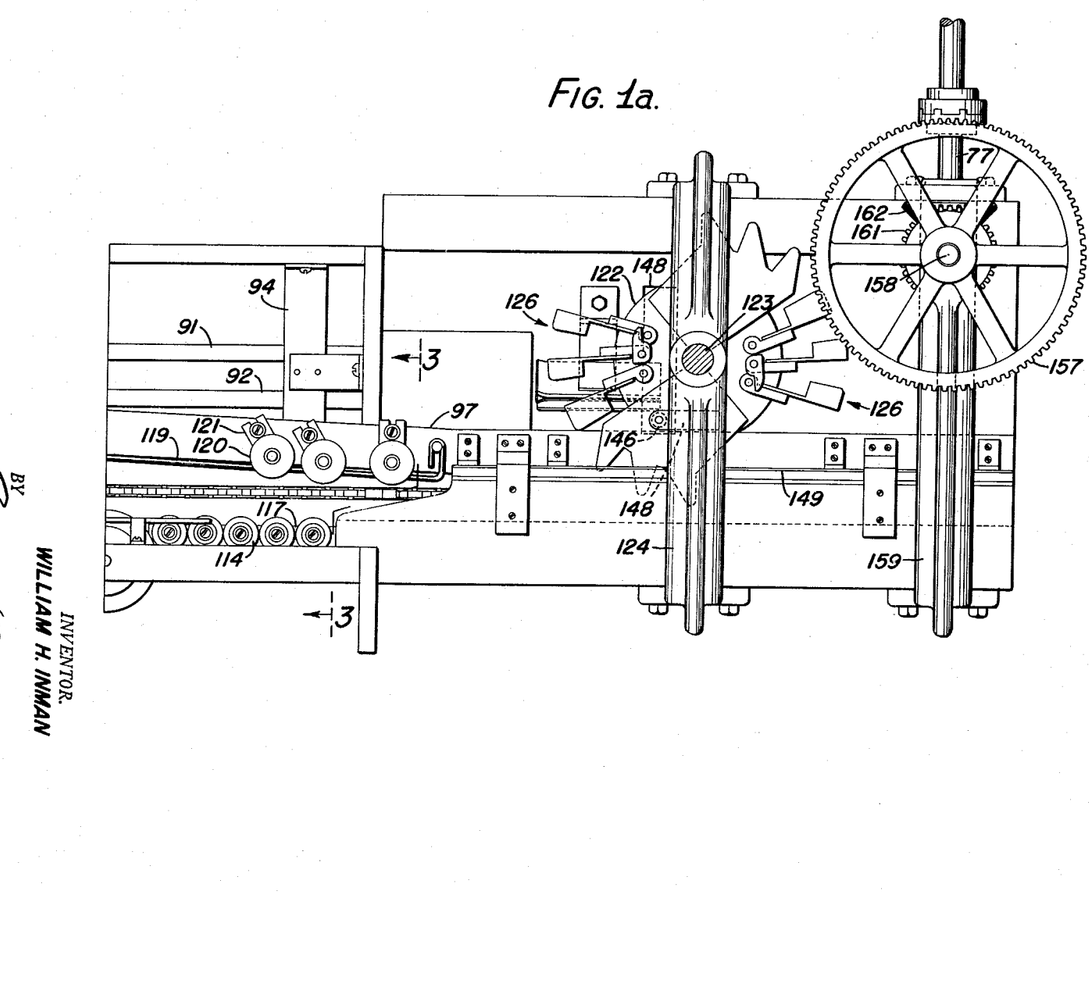
Figure 8:
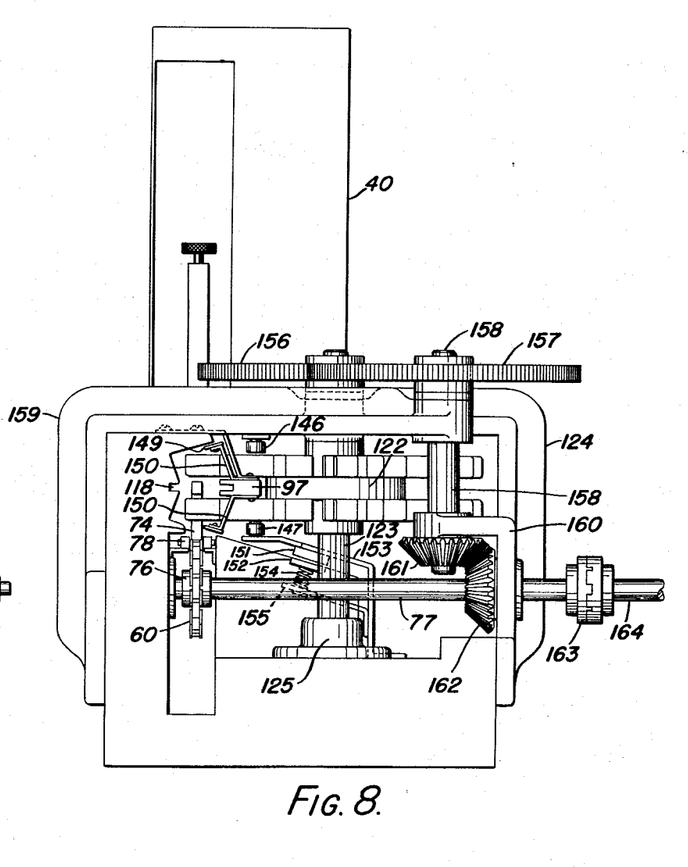
Fig. 8 is an end elevation of the machine as viewed from the right in Fig. 1ª.
Figure 9:
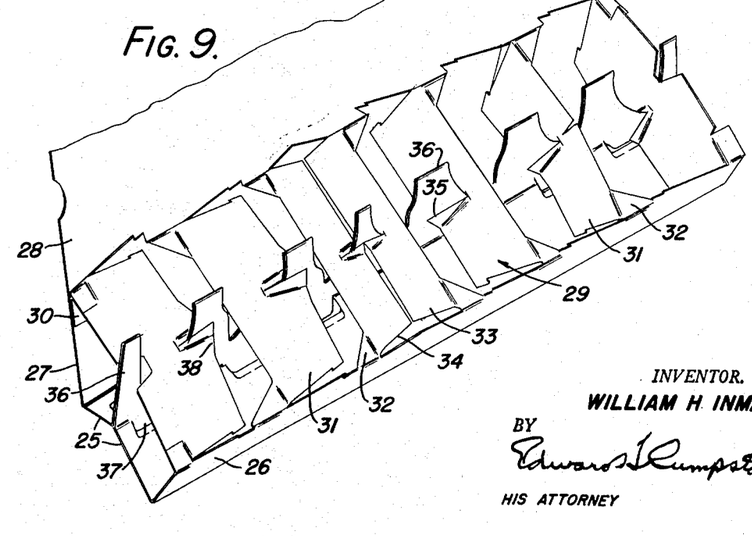
Fig. 9 is a perspective view, partly broken away, of one of the cartons which the machine is adapted to erect.

The means for pivotally setting up these cell-forming, transverse partitions comprises, preferably, a rotatable hub or member 122 (Figs. 1ª and 8), fixed on a vertically extending shaft 123 having its upper end rotatably mounted in a supporting yoke 124 on the frame and its lower end rotatably mounted in a step bearing 125 on the frame, as shown. The hub 122 is thus rotatable in situ and has two sets of fingers, indicated generally at 126, mounted on each of its upper and lower sides, these fingers being arranged, during their rotation with the hub, to engage and swing the two groups of transverse partitions into set up, cell-forming position in the carton as the latter is continuously advanced by the chain arms 74.

Figure 10:
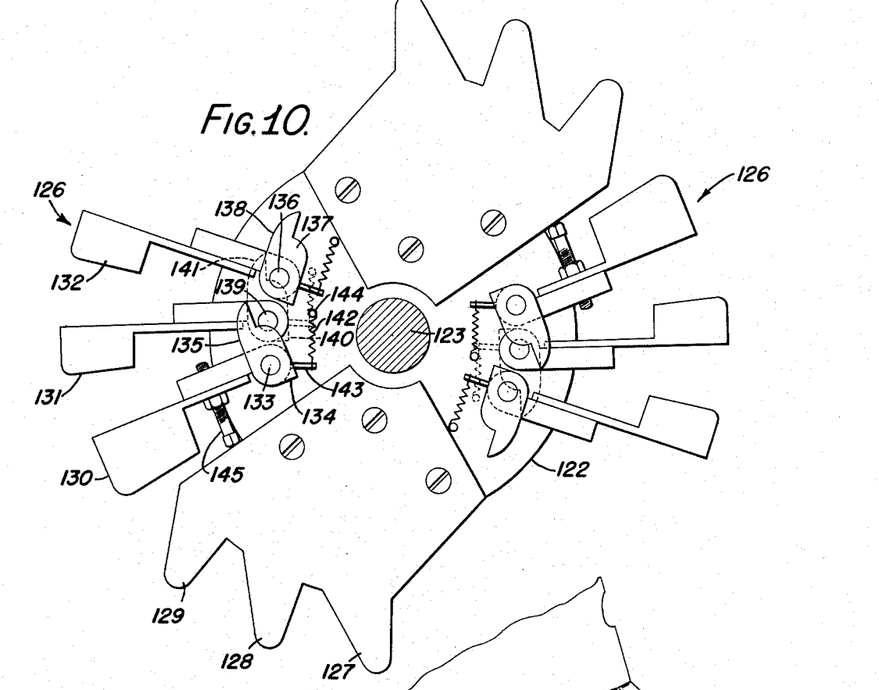
Fig. 10 is an enlarged top plan view, partly in section, of rotatable means for setting up the transverse partitions of the carton.

Each set of fingers 126 on each side of the hub preferably comprises three adjacent fingers, 127, 128 and 129 (Fig. 10), fixed on the hub 122. In addition, this set of fingers comprises three fingers, 130, 131 and 132, each of which is pivotally mounted on the hub, being fixed to a spindle, as 133, which is rotatably mounted in a bearing in the hub. This spindle 133 carries two fingers 130, one on each of its ends on opposite sides of the hub, so that the fingers 130 move together in spaced relation with each other, straddling the longitudinal central partition of the carton and engaging the same transverse partition on opposite sides of the longitudinal partition. The spindle of fingers 130 has fixed thereon an arm 134 formed with a cam face 135. Fingers 132 are similarly fixed on a spindle 136 having an arm 137 formed with a cam face 138 on the same side of the hub as the arm 134 of fingers 130. The fingers 131 are fixed on a similar spindle 139 on which is fixed a similar arm 140 formed with a cam face 141 located on the other side of the hub from the arms 134 and 136, to afford suitable spacing between these several arms. Each finger is provided with a coiled tension spring, as 142, fixed to a pin 143 in the arm and to a pin 144 in the hub for pivotally moving the arm in one direction on the hub until arrested by the engagement of a suitable stop means, such as the adjustable stud 145, against a side of the finger 129, as shown. Each of the fingers 130, 131 and 132 is provided with a similar spring and stop means so that the fingers are normally maintained in uniformly spaced relation circumferentially of the hub, as shown.

Figure 6:
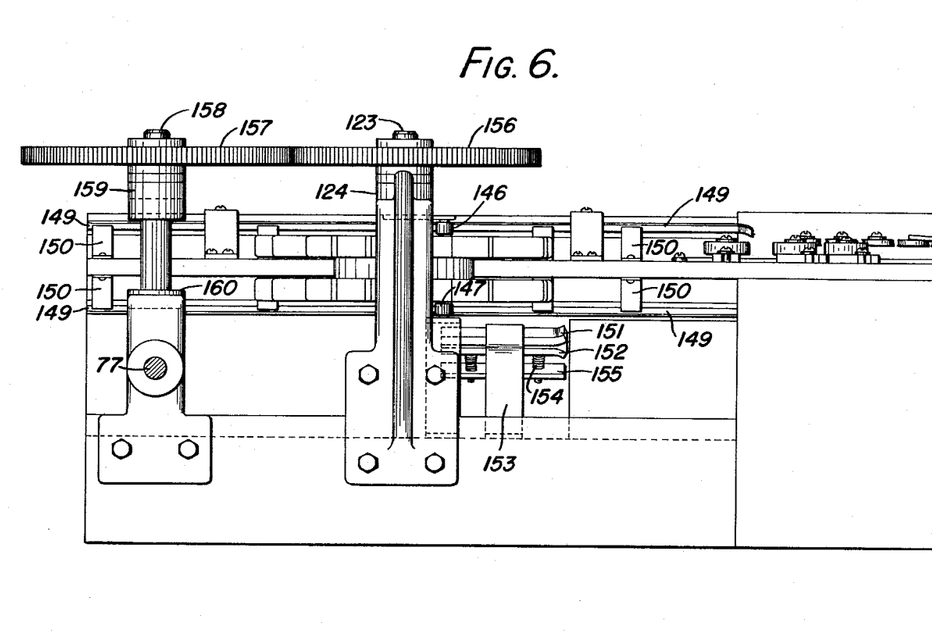
Fig. 6 is an elevation of the parts shown in Fig. 4ª, but as viewed from the other side of the machine.
Figure 6A:
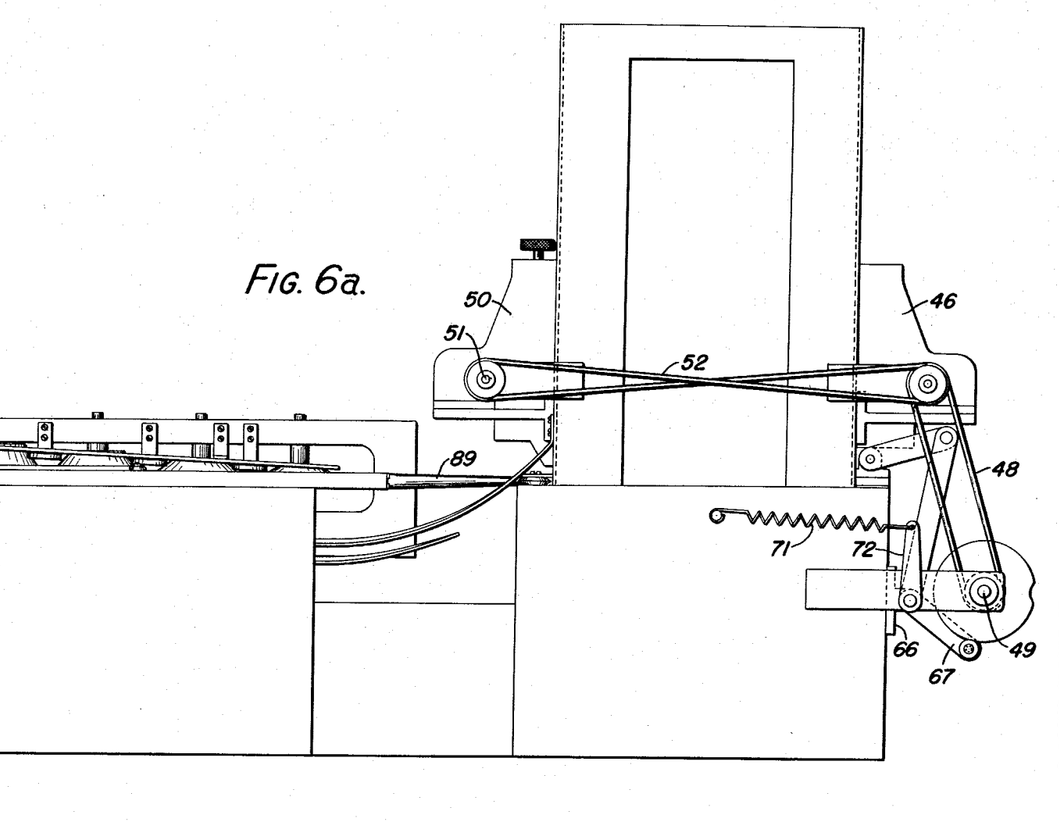
Figures 11, 12, 13, 14, 15:
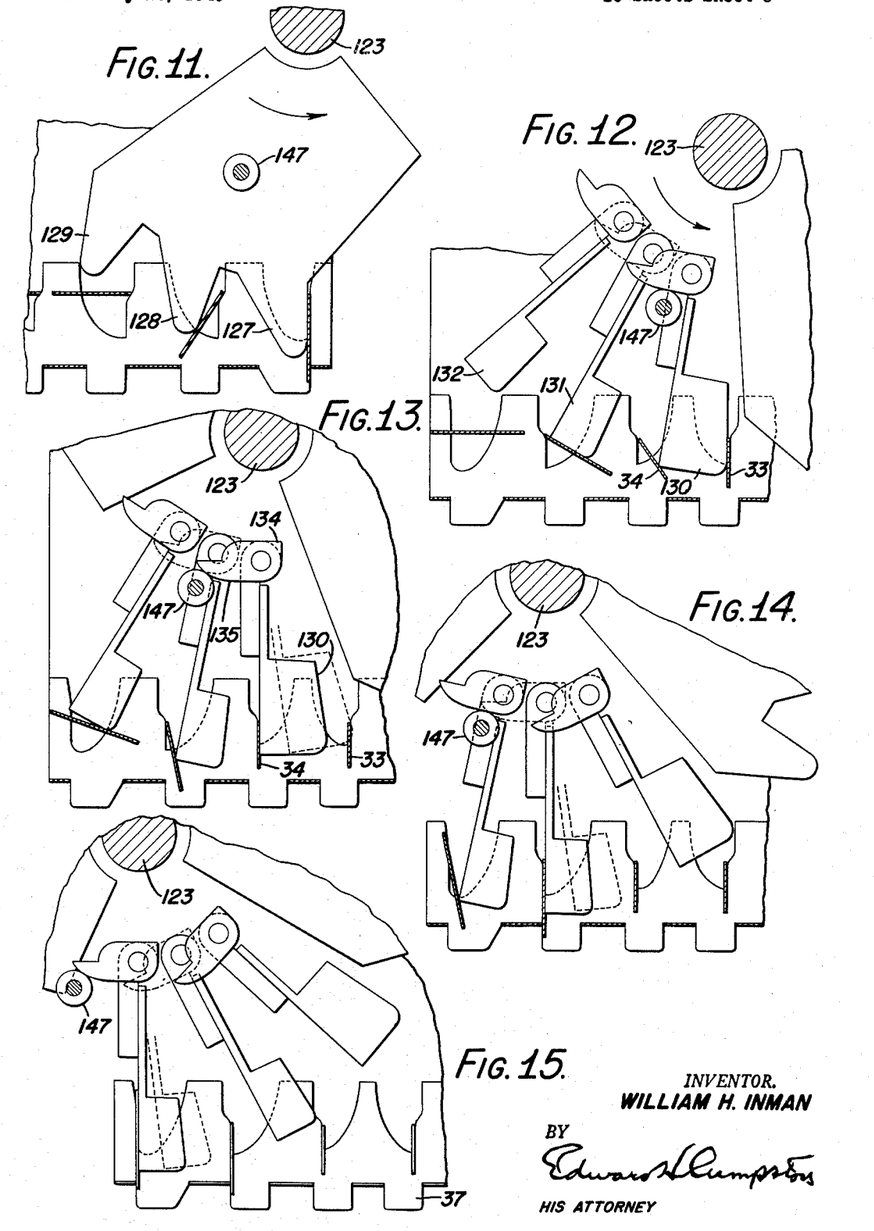
Fig. 11 shows one of the parts of Fig. 10, in the operation of swinging a group of transverse partitions in one direction.
Fig. 12 shows other parts of Fig. 10, in the operation of swinging a group of partitions in the opposite direction.
Figs. 13 to 15, inclusive, are views similar to Fig. 12, but showing successive positions of the parts.

The means for effecting limited pivotal movement of the movable fingers 126 preferably comprises a pair of actuator studs, 146 and 147 (Fig. 6), fixed on brackets, as 148 (Fig. 1ª), on the frame and located on opposite sides of hub 122 in the path of movement of the cam surfaces 135—137 of the arms of the pivoted fingers as they are brought into engagement with such studs during the rotation of the hub. The coaction of these various fingers with the transverse partitions of the carton is illustrated in Figs. 11 to 15, inclusive. The travel of the carton and the rotation and pivotal actuation of the several fingers are coordinated by a common driving means hereafter described, so that one of the two circumferentially spaced sets of fingers on the hub operates on the partitions of each carton as it is moved along its guideway in a direction generally tangential to the path of rotation of the fingers. It will be seen by reference to Fig. 11 that as the carton is moved along toward the right and the fixed fingers 127—129 of the hub are rotated in the same direction, these fingers successively engage the first three partitions of the group including partition 33 (Fig. 9), so as to depress and swing these three partitions in the same direction to vertical position, the rate of travel of the fingers being coordinated with the rate of travel of the carton so as to properly effect such movement of the partitions. The fourth partition 33 and its adjacent oppositely swinging partition 34 are then engaged by pivoted finger 130 in such coordinated relation as to properly erect the partition 33. At the same time, the opposite side of the finger (Fig. 12) engages and swings partion 34 to erect position (Fig. 14), the arm 134 of the finger being meanwhile engaged with the actuator stud 147 to retard the travel of this finger below the speed of travel of the carton so as to move the partition 34 in a relatively backward direction to erect position, as shown. At this instant, however, the cam surface 135 of the arm is moved by the rotation of the hub to disengage stud 147 and the finger is swung by its spring 142 at a rate faster than the travel of the partition, so as to disengage and leave partition 34 in erected position, as shown in Fig. 14. The remaining fingers 131 and 132 are similarly rotated into engagement with the remaining partitions of the group including partition 34, being at first retarded by the engagement of their arms with the stud 147 until these partitions are erected after which the arms disengage the stud and are accelerated by their springs so as to disengage and leave their respective partitions in properly set up position. The setting up of the partitions is thus completed as the carton is continuously advanced past the setting up fingers and the carton, in fully set up condition, is ejected from its guideway at the end of the machine ready for filling with its intended contents.

While the cross partitions are being set up by the fingers as described above, the cartons are preferably maintained with their bottom portions in contact with the side wall of the frame by hold-down strips 149 (Figs. 1a, 6 and 8), mounted on brackets 150 on the bar 97, so that the edge of the strips engage the tops of the cross partitions to maintain the carton in position as described. Also, to prevent the fingers from moving the carton away from the propelling chain arm 74, the carton cover pass between the opposing surfaces of braking strips 151 and 152 (Figs. 6 and 8), the first of which is carried by a bracket 153 on the frame. Brake strip 152 is carried by coiled compression springs 154 mounted on an arm 155 of the bracket 153.

The means for rotating hub 122 and its shaft 123 comprises a spur gear 156 (Figs. 6 and 8), fixed on the upper end of the shaft and meshing with a spur gear 157 fixed on the upper end of a shaft 158 rotatably supported in bearings in a yoke 159 and a bracket 160 on the frame. The lower end of the shaft 158 has fixed thereon a bevel gear 161 meshing with a bevel gear 162 fixed on shaft 77. The latter is releasably connected by means of a clutch 163 with a shaft 164 driven by any suitable motor means. Since shaft 77 drives chain 60 and its arm 74 which move the carton along their guideway and also drives the hub and fingers for swinging the transverse partitions, these parts are moved in positively coordinated relation.

In operation, the hopper is kept supplied with a stack of collapsed cartons which are fed one at a time from the bottom of the stack into the path of movement of the arms 74 which positively engage all of the superposed folds of the trailing edge of the carton to move it against the resistance of the setting up means. As the carton is continuously advanced along its path or guideway, its bottom folds are separated by the knife-edge disk 84 preliminary to the engagement therebetween of the devices for distending and setting up the bottom and side walls. At the same time the folded portions of the top wall are depressed or flattened and these several carton walls are thus brought to fully set up position through the continuous movement of the carton in engagement with these stationary guide devices extending at an inclination to the carton path. After the setting up of the body of the carton is thus accomplished, a series of fingers rotated in situ engage the cross partitions while the carton continues its movement, the fingers being moved at different speeds to effect the folding of the two groups of partitions in opposite directions, respectively, to complete the setting up of the carton.

It is evident from the above description that the invention provides a simple, practical and efficient machine for automatically setting up cartons of the character described, wtih a minimum of movable parts and with a rapid and efficient rate of production of the cartons, ready for filling with their contents.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A machine for setting up cartons having folding side walls and having groups of transverse partitions adapted to be folded in different directions, respectively, to positions for dividing the said carton into a plurality of cells, said machine comprising means for moving a collapsed carton in a path, devices for distending and setting up the side walls of the carton during said carton movement, and mechanism rotating about axis means substantially perpendicular to said path in engagement with said partition groups during said carton movement to fold the same in different directions, respectively, for folding said partitions to cell forming positions to complete the setting up of the carton.

2. A machine for setting up cartons having folding side walls and a plurality of transverse partitions adapted to be folded to position to divide the carton into a plurality of cells, said machine comprising means for moving a collapsed carton in a path, devices for distending and setting up the side walls of the carton by and during said carton movement, and mechanism having parts movable at different speeds in engagement with different ones of said partitions, respectively, during said carton movement to fold said partitions to cell forming positions to complete the setting up of the carton.

3. A machine for setting up cartons having folding side walls and having groups of transverse partitions adapted to be folded in different directions, respectively, to positions for dividing the carton into a plurality of cells, said machine comprising means for moving a collapsed carton in a path, devices for distending and setting up the side walls of the carton during said carton movement, and mechanism having parts movable at uniform speed during said carton movement for folding one of said partition groups in one direction and parts movable at variable speed for folding another of said partition groups in another direction to fold said partitions to cell forming positions to complete the setting up of the carton.

4. A machine for setting up cartons having folding side walls and having groups of transverse partitions adapted to be folded in different directions, respectively, to positions for dividing the carton into a plurality of cells, said machine comprising means for moving a collapsed carton in a path, devices for distending and setting up the side walls of the carton during said carton movement and mechanism having a movable member provided with fingers fixed thereon and with fingers movably mounted thereon for engagament with different groups of said partitions, respectively, during said carton movement, and means for moving said movably mounted fingers relative to said member during said movement thereof, for folding one of said partition groups in one direction and another of said partition groups in a different direction to fold said partitions to cell forming positions to complete the setting up of the carton.

5. A machine for setting up cartons having folding side walls and having groups of transverse partitions adapted to be folded in different directions, respectively, to positions for dividing the carton into a plurality of cells, said machine comprising means for moving a collapsed carton in a path, guide devices extending at an inclination to said path of movement of the carton and operated by the movement of the carton in said path for distending and setting up the side walls of the carton, and mechanism having a movable member provided with fingers fixed thereon and with fingers movably mounted thereon for engagement with different groups of said partitions, respectively, during said carton movement, and means for moving said movably mounted fingers relative to said member during said movement thereof, for folding one of said partition groups in one direction and another of said partition groups in a different direction to fold said partitions to cell forming positions to complete the setting up of the carton.

6. A machine for setting up cartons having folding side walls and having groups of transverse partitions adapted to be folded in different directions, respectively, to positions for dividing the carton into a plurality of cells, said machine comprising means for moving a collapsed carton in a path, guide devices extending at an inclination to said path of movement of the carton and operated by the movement of the carton in said path for distending and setting up the side walls of the carton, mechanism having a rotary member provided with fingers fixed thereon and with fingers pivotally mounted thereon, and means for rotating said member and for moving said pivotally mounted fingers relative to said member in synchronized coordination with said carton movement to engage and fold said groups of partitions in different directions, respectively, to cell forming positions to complete the setting up of the carton.

7. A machine for setting up cartons having folding side walls and a plurality of transverse partitions adapted to be folded to position to divide the carton into a plurality of cells, said machine comprising means for moving a collapsed carton in a path, stationary knife-edged means for separating said side walls, stationary devices rotatable in situ for distending and setting up said side walls, and mechanism rotating about axis means substantially perpendicular to said path in engagement with said partitions for folding the same to cell forming position to complete the setting up of the carton during said movement thereof.

8. A machine for setting up cartons having folding side walls and a plurality of transverse partitions adapted to be folded to position to divide the carton into a plurality of cells, said machine comprising means for moving a collapsed carton in a path, knife-edged means for separating said side walls, guide devices extending at an inclination to said path of movement of the carton and having rotatably mounted friction-reducing elements for engaging, distending and setting up said side walls during said carton movement, and mechanism rotating about axis means substantially perpendicular to said path in engagement with said partitions during said carton movement to fold the same to cell forming position to complete the setting up of the carton.

9. A machine for setting up cartons having folding side walls and a plurality of transverse partitions adapted to be folded to position to divide the carton into a plurality of cells, said machine comprising means for moving a collapsed carton in a path, knife-edged means for separating said side walls, guide devices extending at an inclination to said path of movement of the carton and having rotatably mounted friction-reducing elements for engaging, distending and setting up said side walls during said carton movement, and mechanism provided with rotary fingers for engaging said carton partitions during said carton movement to fold said partitions to cell forming position to complete the setting up of the carton.

10. A machine for setting up cartons having folding side walls and groups of transverse partitions adapted to be folded in different directions, respectively, to positions to divide the carton into a plurality of cells, said machine comprising means for moving a collapsed carton continuously in a path, knife-edged means for separating said side walls, guide devices extending at an inclination to said path of movement of the carton and having rotatably mounted, friction reducing elements for engaging, distending and setting up said side walls during said carton movement, and mechanism rotating about axis means substantially perpendicular to said path in engagement with said partition groups during said carton movement to fold the same in different directions, respectively, for folding said partitions to cell forming positions to complete the setting up of the carton.

11. A machine for setting up cartons having folding side walls and groups of transverse partitions adapted to be folded in different directions, respectively, to positions to divide the carton into a plurality of cells, said machine comprising a carton guideway, an endless flexible element provided with means for engaging and moving a carton in a path, means for effecting continuous movement of said element, guide devices extending at an inclination to said path and having rotatably mounted, friction reducing elements for engaging, distending and setting up said carton side walls during said carton movement, and mechanism having parts movable into engagement with said carton partitions, respectively, during said movement of said carton by said element for engaging said partition groups and swinging the same in different directions, respectively, for folding said partitions to cell forming positions to complete the setting up of the carton.

12. A machine for setting up cartons having folding side walls and a plurality of transverse partitions adapted to be folded to position to divide the carton into a plurality of cells, said machine comprising an endless flexible element provided with spaced means for moving a succession of collapsed cartons in a path, means for effecting continuous movement of said element, guide devices extending at an inclination to said path and having rotatably mounted, friction reducing elements for engaging, distending and setting up the carton side walls during said carton movement, and mechanism provided with rotary fingers for engaging said carton partitions during said carton movement to fold said partitions to cell forming position to complete the setting up of the carton.

13. A machine for setting up cartons having folding side walls and a plurality of transverse partitions adapted to be folded to position to divide the carton into a plurality of cells, said machine comprising a carton guideway, an endless flexible element provided with spaced arms for engaging and moving a succession of cartons along said guideway, means for effecting continuous movement of said element, devices for distending and setting up the side walls of the carton during said carton movement, and mechanism rotating about axis means substantially perpendicular to the movement of said cartons in engagement with said partition groups during movement of the carton by said element for folding said partitions to cell forming position to complete the setting up of the carton.

14. A machine for setting up cartons having folding side walls and a plurality of transverse partitions adapted to be folded to position to divide the carton into a plurality of cells, said machine comprising a hopper for holding a stack of collapsed cartons, a carton guideway, means for advancing a bottom carton of said stack toward said guideway, an endless flexible element provided with arm means for engaging a carton advanced by said means, means for effecting continuous movement of said element to move said carton along said guideway, devices for distending and setting up the side walls of a carton during said carton movement, and mechanism rotating about axis means substantially perpendicular to said path in engagement with said partitions during movement of the carton by said element for folding said partitions to cell forming position to complete the setting up of the carton.

15. A machine for setting up cartons having folding side walls and a plurality of transverse partitions adapted to be folded to position to divide the carton into a plurality of cells, said machine comprising a hopper for holding a stack of collapsed cartons, a carton guideway, reciprocating means for engaging an edge of a bottom carton of said stack and advancing the same along said guideway, an endless flexible element provided with an arm for engaging a carton advanced by said means, means for effecting continuous movement of said element to move said carton along said guideway, devices for distending and setting up the side walls of a carton during said carton movement, and mechanism rotating about axis means substantially perpendicular to said path in engagement with said partitions during movement of said carton by said element for folding said partitions to cell forming position to complete the setting up of the carton.

16. A machine for setting up cartons having folding side walls and a plurality of transverse partitions adapted to be folded to position to divide the carton into a plurality of cells, said machine comprising a hopper for holding a stack of collapsed cartons, a carton guideway, reciprocating means for engaging an edge of a bottom carton of said stack below the top of said edge for advancing said carton along said guideway, an endless flexible element having an arm for engaging the edge of a carton advanced by said means through at least the full height of said carton edge, means for effecting continuous movement of said element for moving said carton along said guideway, devices for distending and setting up the side walls of a carton during said carton movement, and mechanism rotating about axis means substantially perpendicular to said path in engagement with said partitions during the movement of the carton by said element for folding said partitions to cell forming position to complete the setting up of the carton.

17. A machine for setting up cartons having folding side walls and a plurality of transverse partitions adapted to be folded to position to divide the carton into a plurality of cells, said machine comprising a hopper for holding a stack of collapsed cartons, a carton guideway, reciprocating means for engaging an edge of a bottom carton of said stack below the top of said edge for advancing said carton along said guideway, an endless flexible element having an arm provided with a resiliently yieldable portion for engaging an edge of a carton beneath said stack through at least the full height of said carton edge, means for effecting continuous movement of said element for moving a carton along said guideway, devices for distending and setting up the side walls of a carton during said carton movement, and mechanism operating during movement of said carton by said element to fold said partitions to cell forming position to complete the setting up of the carton.

18. A machine for setting up cartons having folding side walls and a plurality of transverse partitions adapted to be folded to position to divide the carton into a plurality of cells, said machine comprising a hopper for holding a stack of collapsed cartons, a carton guideway, reciprocating means for engaging an edge of a bottom carton of said stack below the top of said edge for advancing said carton along said guideway, and endless flexible element having an arm provided with a resiliently yieldable portion for engaging an edge of a carton beneath said stack through at least the full height of said carton edge, means for effecting continuous movement of said element for moving a carton along said guideway, devices for distending and setting up the side walls of a carton during said carton movement, and mechanism having parts movable into engagement with said carton partitions, respectively, during movement of said carton by said element to fold said partitions to cell forming position to complete the setting up of the carton.

19. A machine for setting up cartons having folding side walls and a plurality of transverse partitions adapted to be folded to position to divide the carton into a plurality of cells, said machine comprising a carton guideway, an endless flexible element provided with means for engaging and moving a carton along said guideway, means for effecting continuous movement of said element, devices for distending and setting up the side walls of said carton during said carton movement, and mechanism having a plurality of fingers rotated in engagement successively with said carton partitions, respectively, during movement of said carton by said element to fold said partitions to cell forming position to complete the setting up of the carton.

20. A machine for setting up cartons having folding side walls and having groups of transverse partitions adapted to be folded in different directions, respectively, to positions for dividing the carton into a plurality of cells, said machine comprising a carton guideway, an endless flexible element provided with means for engaging and moving a carton along said guideway, means for effecting continuous movement of said element, devices for distending and setting up the side walls of said carton during said carton movement, and mechanism having fingers rotating at different speeds for folding said partition groups in different directions, respectively, to fold said partitions to cell forming position to complete the setting up of the carton.

21. A machine for setting up cartons having folding side walls and a plurality of transverse partitions adapted to be folded to position to divide the carton into a plurality of cells, said machine comprising means for moving a collapsed carton in a path, guide devices extending at an inclination to said path of movement of the carton and having rotatably mounted, friction reducing elements for engaging, distending and setting up said side walls during said carton movement, mechanism for engaging said carton partitions during said carton movement to fold said partitions to cell forming position to complete the setting up of the carton, and means for frictionally restraining movement of said carton by said mechanism.

22. A machine for setting up cartons having folding side walls and a plurality of transverse partitions adapted to be folded to position to divide the carton into a plurality of cells, said machine comprising an endless flexible element provided with means for engaging and moving a collapsed carton in a path, means for effecting continuous movement of said element, guide devices having rotatably mounted, friction reducing elements for engaging, distending and setting up said side walls during said carton movement, mechanism having parts for engaging said carton partitions, respectively, during said carton movement to fold said partitions to cell forming position to complete the setting up of the carton, and means for frictionally restraining movement of said carton by said partition engaging parts.

23. A machine for setting up cartons having folding side walls and a plurality of groups of transverse partitions adapted to be folded to position to divide the carton into a plurality of cells, said machine comprising an endless flexible element provided with means for engaging and moving a carton in a path, means for effecting continuous movement of said element, guide devices having rotatably mounted, friction reducing elements for engaging, distending and setting up said side walls during said carton movement, mechanism engaging said partition groups during said carton movement for moving said partition groups, respectively, in different directions for folding said partition to cell forming positions, and means for frictionally restraining movement of said carton by said mechanism.

24. A machine for setting up cartons having folding side walls and groups of transverse partitions adapted to be folded in different directions, respectively, to positions to divide the carton into a plurality of cells, said machine comprising a hopper for holding a stack of collapsed cartons, a carton guideway, means for feeding a bottom carton of said stack toward said guideway, an endless flexible element having an arm for engaging a carton advanced by said means, means for effecting continuous movement of said element to move said carton along said guideway, devices having rotatably mounted, friction reducing elements for engaging, distending and setting up said side walls during said carton movement, mechanism having fingers engaging said partition groups for moving the same in different directions, respectively, for folding said partitions to cell forming positions, means for rotating said fingers in situ, and means for frictionally restraining movement of said carton by said fingers.

References Cited in the file of this patent

UNITED STATES PATENTS

| | | |
|---|---|---|
| 276,497 | Stocking | Apr. 24, 1883 |
| 1,527,030 | Delamere | Feb. 17, 1925 |
| 1,657,577 | Kronmiller | Jan. 31, 1928 |
| 1,942,466 | Adams | Jan. 9, 1934 |
| 1,994,241 | Burger | Mar. 12, 1935 |
| 2,010,816 | Gray | Aug. 13, 1935 |
| 2,018,396 | Burger | Oct. 22, 1935 |
| 2,057,082 | Burger | Oct. 13, 1936 |
| 2,440,840 | Blackwell | May 4, 1948 |
| 2,441,372 | Quigley | May 11, 1948 |
| 2,479,994 | Annen | Aug. 23, 1949 |
| 2,585,201 | Wetzler | Feb. 12, 1952 |
| 2,592,880 | Ferraro | Apr. 15, 1952 |